Dec. 15, 1964   D. J. LEVINSON   3,161,839
MEANS FOR SHIFTING THE PHASE OF POLARIZATION IN
HIGH FREQUENCY WAVE GUIDES
Filed June 4, 1962   2 Sheets-Sheet 1
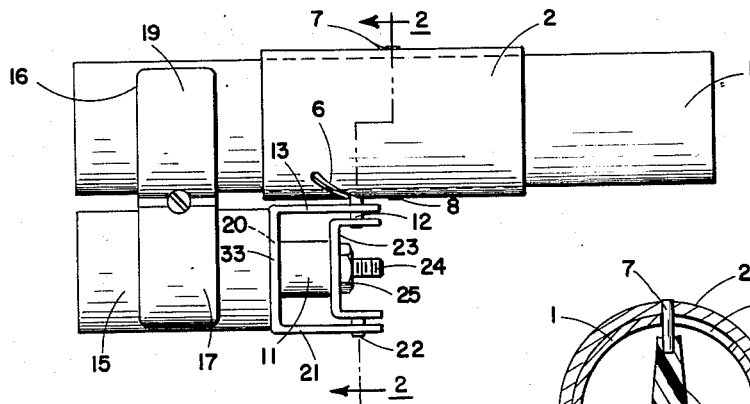
FIG. 1
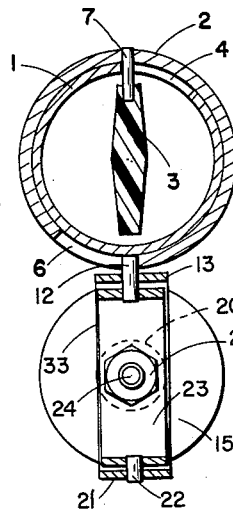
FIG. 2
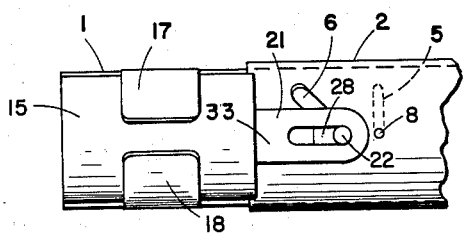
FIG. 3
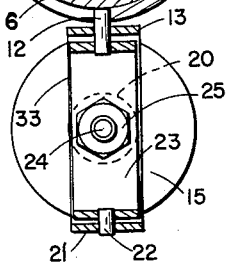
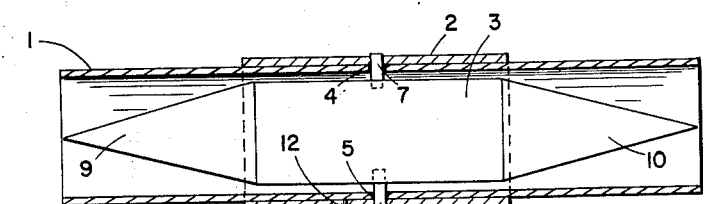
FIG. 4
FIG. 5
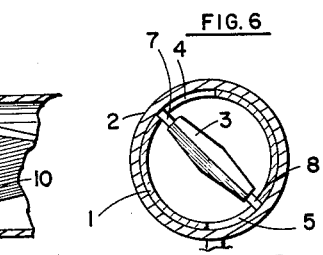
FIG. 6
INVENTOR.
David J. Levinson
BY
Le Roy J. Leishman
AGENT Dec. 15, 1964   D. J. LEVINSON   3,161,839
MEANS FOR SHIFTING THE PHASE OF POLARIZATION IN
HIGH FREQUENCY WAVE GUIDES
Filed June 4, 1962   2 Sheets-Sheet 2

INVENTOR.
David J. Levinson
BY
LeRoy J. Leishman
AGENT

United States Patent Office

3,161,839
Patented Dec. 15, 1964

3,161,839
MEANS FOR SHIFTING THE PHASE OF POLARIZATION IN HIGH FREQUENCY WAVE GUIDES
David J. Levinson, 5738 Vanalden Ave., Tarzana, Calif.
Filed June 4, 1962, Ser. No. 199,960
11 Claims. (Cl. 333—31)

The invention herein described pertains to wave guides, and more particularly to means for varying the phase shift of polarization or changing the pattern of the beam.

In most devices heretofore used for the aforementioned purposes, the phase of polarization has been shifted by manually operable means or by relatively complicated mechanical or electrical arrangements.

One object of the present invention is to achieve these ends with a simple electro-mechanical device.

Another object of the present invention is to provide means that may be repeated in multiple along the length of a wave guide tube for independently rotating vanes within said tube, each through a predetermined angle by simple, easily controlled electro-mechanical means.

Another object is to supply a device of the type described in which the rotation of a vane within the wave guide tube may be effected by means of a solenoid located outside the wave guide.

Still other objects will appear as the specification proceeds.

In the drawings:

FIG. 1 shows a tubular wave guide, or section thereof, with my novel means for rotating the plane of polarization attached thereto.

FIG. 2 is a section taken on line 2—2 of FIG. 1.

FIG. 3 is a broken-away bottom view of the device of FIG. 1.

FIG. 4 shows the device of FIG. 1 with the tubular wave guide shown in longitudinal section and with some of the other components partly broken away.

FIG. 5 is a broken-away view of the part shown in FIG. 4 but with the external sleeve and internally mounted vane rotated approximately 45 degrees toward the observer from the angular position in which these parts are shown in FIG. 4.

FIG. 6 is a view taken on line 6—6 of FIG. 5.

Figure 7:
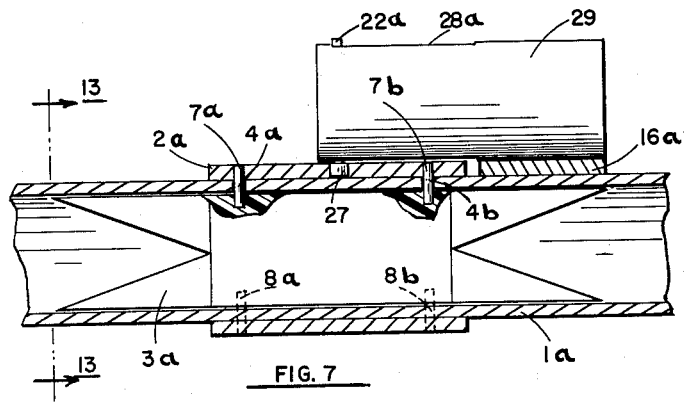
FIG. 7 is a broken away view, partly in longitudinal section, of a modified embodiment of my invention.

In order to correlate the views of the two embodiments shown in the thirteen figures, components of the species of FIGS. 7 to 13, inclusive, have been given the same reference numerals as the corresponding parts in the species of FIGS. 1 to 6, inclusive, followed by a lower case letter, excepting where the part is an additional element, in which case a new reference number is used.

The cylindrical structure 1 is a section of a wave guide which within its total length may contain a series of vanes for attenuating or changing the pattern of such waves as may be guided therethrough, or for rotating or otherwise altering the plane of polarization of such waves. Some of these vanes may be fixed in their angular position with respect to the wave guide, as is well known in the art, and others may be removable or rotatable.

The illustrative embodiments of my invention herein shown each contain only one such vane, but it will be obvious that others of the same or similar types may be provided. Inasmuch as an attenuator may thus contain one or more vanes, the cylindrical section 1 of the various figures may be considered either as an embodiment including only one vane, or as a section of an attenuator having a plurality of vanes. In the latter case, if the design requirements necessitate more than one angularly movable vane, then a plurality of sleeves, such as the sleeve 2 would be provided along the total length of the attenuator, each sleeve being associated with an angularly movable vane, having means whereby it is caused to rotate with the sleeve.

The cylinder 1 has a pair of diametrically opposite slots 4 and 5, FIGS. 4 and 6, extending angularly therearound for passing a pair of longitudinally aligned and diametrically opposed pins 7 and 8 having their outer ends embedded in the walls of the sleeve and their inner ends embedded in the vane 3, which may be formed in any appropriate manner from a suitable dielectric material. The vane may be rectangular in shape, if such configuration conforms with the design requirements, or the ends may be pointed or recessed or given such other shape as will best serve to match the impedance of the section with which we are dealing to that of the immediately adjoining sections of the total attenuator or wave guide. The particular shape of the ends 9 and 10 of the vane shown in FIG. 4 are thus merely symbolic.

From the foregoing description of the interconnection between the sleeve 2 and the vane 3, it will be apparent that the rotation of the sleeve will cause the vane 3 to rotate within an angle that is determined by the angular length of the slots 4 and 5. These slots may therefore have a length of less than 45 degrees, as indicated in the drawings, or a length sufficient to permit the rotation of the sleeve and vane through a total angular distance of 90 degrees.

The sleeve 2 has formed therein a helical slot 6 which extends for a predetermined distance therearound in a direction intermediate the longitudinal axis of the sleeve and any diameteral plane therethrough. The purpose of this helically extending slot 6 will immediately be apparent.

A rectilinearly movable member 11 is constrained by appropriate means from translational movement in a direction parallel to the axes of the cylinder 1 and the sleeve-cylinder 2. A pin 12 is appropriately connected to member 11 for translational movement therewith. In order to constrain pin 12 from angular movement around the axis of member 11, I provide guiding means for the pin 12, this means comprising, in the first embodiment shown, a bracket 33 having an arm 13 with a longitudinal slot 14, FIGS. 4 and 5, formed therein. The pin 12 extends through slot 14 in arm 13 into the slot 6 in sleeve 2. Inasmuch as the pin 12 is slidable within both slots 14 and 6, it will be clear that the translational movement of pin 12 will cause the sleeve 2 to rotate because of the cam-like action of the pin 12 upon the sides of the slot 6. As a result of the interconnection between the sleeve 2 on the outside of the cylinder 1 and the vane 3 on the inside of this cylinder, it will be apparent that the rotation of sleeve 2 in response to the rectilinear movement of member 11, will produce angular rotation of the vane 3.

Member 11 may of course be moved manually, in which case it is provided with appropriate longitudinal guides. However, my invention contemplates that the rectilinearly movable member 11 may be moved by means of a solenoid, if desired. Such a solenoid 15 is shown in FIGS. 1 to 5, inclusive. It is mounted by any appropriate means to assure that the translationally movable member 11, which in this case constitutes the core of the solenoid, will move through the usual central opening within the coil of the solenoid in a direction that is parallel to the axes of the tubes 1 and 2.

In the first embodiment illustrated, a bracket 16 serves for mounting the solenoid 15 in suitable relationship with respect to the tubes, the bracket 16 being shown with its opposite arms 17 and 18 gripping the solenoid, and an opposite pair of arms of which only arm 19 is shown, gripping the tube 1. Where a solenoid is used for imparting rectilinear movement to member 11, I prefer to form the mounting bracket 33 in the shape of a channel as shown in the figures, and to provide it with a central opening 20, FIG. 2, through which the plunger 11 may centrally pass. In this case, a second slot like slot 14 is provided in the arm 21, FIG. 1, that parallels arm 13 on the opposite side of this bracket. Arm 21 contains a slot 28, FIG. 3, that parallels the slot 14 in the arm 13 of the bracket. A pin 22, which is integrally connected to the plunger 11, moves in this second slot. In this species of my invention, I prefer that the pins 12 and 22 be integrally connected to the plunger 11 by means of a U-shaped or channel-shaped bracket 23 shown on the threaded, reduced end 24 of the plunger 11 and secured thereon by means of a nut 25.

With the construction hereinfore described, it will be apparent that the energizing of the coil of the solenoid 15 will pull the plunger 11 toward a central position within the coil and thus rotate the vane 3 in response thereto.

FIGS. 7 to 13, inclusive, illustrate a modification of the embodiment of my invention shown in the previously described figures. Parts used in this embodiment are designated by the same numerals that designate corresponding parts in the previously described species, excepting that a lower case letter has been added, as explained in the brief description of the various figures. However, components that are not used in the species of FIGS. 1 to 6, inclusive, are indicated by numerals not heretofore employed.

Figure 13:
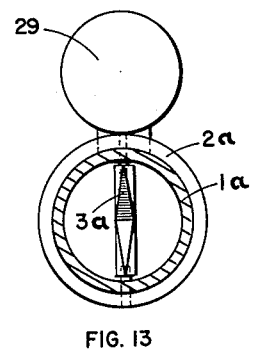
FIG. 13 is a cross-section taken on line 13—13 of FIG. 7.

As mentioned in an earlier portion of this specification, any form of vane or dielectric shape may be employed so far as the instant use of the invention is concerned. To illustrate this fact, a different configuration of dielectric shape 3a is shown in FIGS. 7, 8 and 13.

In order to hold the dielectric shape more securely in its diametral alignment within the tube, indicated in the instant species by the reference characters 1a, two pairs of diametrically opposed pins are used to connect the sleeve 2a with the vane 3a, instead of one pair as shown in the illustrative embodiment previously discussed. In FIG. 7, these pairs of pins are 7a–8a and 7b–8b. Cooperating slots 4a–5a and 4b–5b are of course provided in the tube 1a as counterparts for the single pair of slots in the species of the previously described figures.

Figure 8:
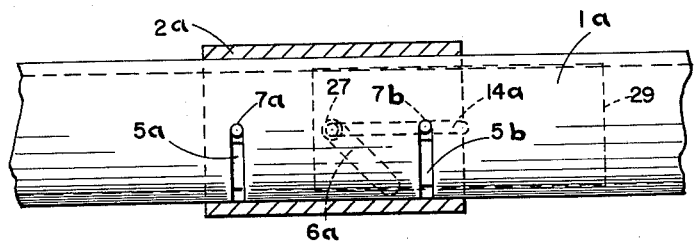
FIG. 8 is a broken away bottom view of the structure of FIG. 7, with one of the members shown in longitudinal section.
Figure 11:
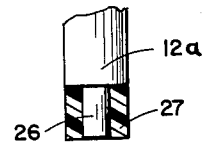
FIG. 11 is an enlarged view of the lower portion of one of the elements of the structure of FIGS. 7, 8, 9 and 10, showing its reduced end with a roller mounted thereon.
Figure 9:
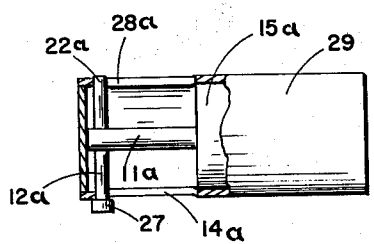
FIG. 9 is a broken away view, partly in longitudinal section, of the solenoid structure shown at the top in FIG. 7.
Figure 10:
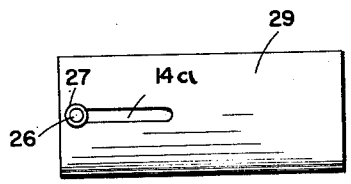
FIG. 10 is a bottom view of the structure shown in FIG. 9.
Figure 12:
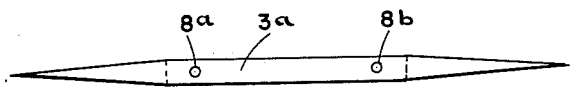
FIG. 12 is a top edge view of the dielectric shape or vane that is a component of the structures of FIGS. 7 and 8.

FIGS. 7, 9 and 10 show a modified arrangement whereby a solenoid 15a may actuate the mechanism. The solenoid plunger 11a, FIG. 9, like the plunger 11 in the previously described embodiment, has opposed lateral arms, these being indicated by the reference characters 12a and 22a. In this embodiment, the solenoid 15a may be housed in a tubular container 29 having diametrically opposed longitudinally extending slots 14a and 28 that perform the function of the opposing slots in the bracket 33 in the previously discussed species.

The arm or pin 12a has a reduced end 26 on which is rotatably mounted a roller 27, which may be formed of any suitable material such as brass, Teflon or Nylon. The roller 27 extends into the diagonal slot 6a as shown in FIGS. 8 and 7, the smooth roller serving to reduce the friction against the side walls of the slot. It will of course be understood that the pin 12a and its roller 27 operate in the same way with respect to the slot in the sleeve or outer tube as does the corresponding pin 12 shown in FIGS. 4 and 5.

FIG. 7 illustrates a substitution of a block 16a for attaching the solenoid instead of the bracket 16 shown in previously described figures. The block 16a may be soldered or otherwise rigidly secured to the tube 1a and the housing 29 of the solenoid.

For most purposes, I at present prefer the embodiment of my invention illustrated in FIGS. 7 to 13, inclusive, to the embodiment shown in FIGS. 1 to 6. It will be understood, of course, that most of the components of these two species are interchangeable and that the associated environment of my mechanism for rotating a dielectric shape by means of a longitudinally movable member located adjacent the wave guide may determine the nature, shape and arrangement of the various components.

It will be further understood that the embodiments herein described are only illustrative of the many ways in which the disclosed invention may be utilized and that it may be otherwise practiced within the limits permitted by any structure responding to the appended claims, and that various substitutions, transpositions and changes may be made in the elements thereof without departing from the broad spirit of the invention embodied in the illustrative structures hereinbefore described and shown in the drawings.

My claims are:

1. In a high frequency radio wave guide, a combination including: a first tube for guiding a polarized wave, a second tube surrounding at least a portion of said first tube and having a slot therein extending at least a few degrees therearound at a non-right angle to the axes of said tubes; a member supported exteriorly of said tubes for longitudinal movement in a direction parallel to the axes of said tubes, said member having a depending boss extending therefrom into the slot in said second tube, said boss acting upon longitudinal movement of said member to impart angular movement to said second tube; and a vane for rotating the plane of polarization of said wave, said vane supported within said first tube and so connected to said second tube through the walls of said first tube that the vane and second tube will rotate together and shift the phase polarization of said wave upon longitudinal movement of said member.

2. In a high frequency radio wave guide, a combination including: a first tube for guiding a polarized wave; a second tube surrounding at least a portion of said first tube and having a slot therein extending at least a few degrees therearound at a non-right angle to the axes of said tubes; a solenoid having its coil disposed in fixed relationship to said first tube and parallel thereto, the plunger of said solenoid having a protrusion extending laterally therefrom into the slot in said second tube, said protrusion acting upon longitudinal movement of said plunger in response to the energizing of said coil to impart angular movement to said second tube; and a vane for rotating the plane of polarization of said wave, said vane supported within said first tube and so connected to said second tube through the walls of said first tube that the vane and second tube will rotate together whereby the phase of polarization of said wave will be shifted upon longitudinal movement of the plunger of said solenoid.

3. In a high frequency radio wave guide, a combination including: a first tube for guiding a polarized wave; a second tube surrounding at least a portion of said first tube and having a slot therein extending at least a few degrees therearound at a non-right angle to the axes of said tubes; a solenoid having its coil disposed in fixed relationship to said first tube and parallel thereto, the plunger of said solenoid having a channel-shaped yoke attached to the free end thereof and the opposite sides of said yoke each having an integral pin extending laterally therefrom in a direction away from the other pin; guiding means comprising a pair of diametrically opposed uprights straddling the pin-bearing sides of said yoke said uprights each having a slot so positioned therein that it will slidably receive one of said pins and thereby constrain said yoke against angular movement during longitudinal movement of said plunger; and a vane for rotating the plane of polarization of said wave, said vane supported within said first tube and so connected to said second tube through the walls of said first tube that the vane and second tube may move angularly together with respect to said first tube; one of said pins extending into the slot in said second tube and acting upon longitudinal movement of said plunger in response to the energizing of said coil to rotate said second tube by its cam-like action upon at least one side of the slot in said second tube.

4. In a high frequency radio wave guide, a combination including: a tube for guiding a polarized wave, said tube having a pair of diametrically disposed and angularly extending slots therein; a structure overlying at least the slotted portions of said tube and having a slot therein extending at an angle with respect to both the axis and the slots of said tube; a vane supported within said tube by means of a pair of diametrically opposed pins secured thereto and each extending through one of said pair of slots and securely anchored in said structure, said pins also acting to constrain said structure against movement excepting angularly with respect to said tube; and a member supported exteriorly of said tube and structure for longitudinal movement in a direction parallel to the axis of said tube, said member having a lateral arm with a roller surrounding its end portion and extending into the slot in said structure, said roller acting upon longitudinal movement of said member to impart angular movement to said structure and thereby to said vane through the cam-like action of said roller upon at least one side of the slot in said structure.

5. In a high frequency radio wave guide, a combination including: a tube for guiding a polarized wave, said tube having a pair of diametrically opposed and angularly extending slots therein; a sleeve covering at least the slotted portion of said tube and having a slot therein extending at an angle with respect to both the axis and the slots of said tube; a vane supported within said tube by means of a pair of diametrically opposed pins secured thereto and each extending through one of said pair of slots and securely anchored in said sleeve, said pins also acting to constrain said sleeve against movement excepting angularly with respect to said tube; a solenoid having its coil disposed in fixed relationship to said tube and parallel thereto, the plunger of said solenoid having a laterally extending arm with a reduced end; and a roller surrounding said reduced end and entering the slot in said sleeve, said roller acting upon longitudinal movement of said plunger in response to the energizing of said coil to impart angular movement to said sleeve and thereby to said vane through the cam-like action of said roller upon at least one side of the slot in said sleeve.

6. In a high frequency radio wave guide, a combination including: a tube for guiding a polarized wave, said tube having a plurality of axially spaced pairs of diametrically opposed and circumferentially extending slots therein; a sleeve covering at least the slotted portions of said tube and having a slot therein extending at an angle with respect to both the axes and the slots of said tube; a dielectric shape supported within said tube by a plurality of pairs of diametrically opposed pins secured thereto and each extending through one slot of one of said pairs of slots and securely anchored in said sleeve, said pins also acting to constrain said sleeve against movement excepting angularly with respect to said tube; and a member supported exteriorly of said tube and said sleeve for longitudinal movement in a direction parallel to the axis of said tube, said member having a depending boss extending into the slot in said sleeve, said boss acting upon longitudinal movement of said member to impart angular movement to said sleeve and thereby to said dielectric shape through the cam-like action of said boss upon at least one side of the slot in said sleeve.

7. In a high frequency radio wave guide, a combination including: a tube for guiding a polarized wave, said tube having a plurality of axially spaced pairs of diametrically opposed and circumferentially extending slots therein; a sleeve covering at least the slotted portions of said tube and having a slot therein extending at an angle with respect to both the axis and the slots of said tube; a dielectric shape supported within said tube by a plurality of pairs of diametrically opposed pins secured thereto and each extending through one slot of one of said pairs of slots and securely anchored in said sleeve, said pins also acting to constrain said sleeve against movement excepting angularly with respect to said tube; a solenoid having its coil disposed in fixed relationship to said tube and parallel thereto, the plunger of said solenoid having a laterally extending arm with a reduced end; and a roller surrounding said reduced end and entering the slot in said sleeve, said roller acting upon longitudinal movement of said plunger in response to the energizing of said coil to impart angular movement to said sleeve and thereby to said dielectric shape through the cam-like action of said roller upon at least one side of the slot in said sleeve.

8. In a high frequency radio wave guide, a combination including: a tube for guiding a polarized wave, said tube having a plurality of axially spaced pairs of diametrically opposed and circumferentially extending slots therein; a sleeve covering at least the slotted portions of said tube and having a slot therein extending at an angle with respect to both the axis and the slots of said tube; a dielectric shape supported within said tube by a plurality of pairs of diametrically opposed pins secured thereto and each extending through one slot of one of said pairs of slots and securely anchored in said sleeve, said pins also acting to constrain said sleeve against movement excepting angularly with respect to said tube; and a member supported exteriorly of said tube and said sleeve for longitudinal movement in a direction parallel to the axis of said tube, said member having a laterally extending arm with a reduced end surrounded by a roller entering the slot in said sleeve, said roller acting upon longitudinal movement of said member in response to the energizing of said coil to impart angular movement to said sleeve and thereby to said dielectric shape through the cam-like action of said roller upon at least one side of the slot in said sleeve.

9. In a high frequency radio wave guide, a combination including: a tube for guiding a polarized wave, said tube having a plurality of axially spaced pairs of diametrically opposed and circumferentially extending slots therein; a sleeve covering at least the slotted portions of said tube and having a slot therein extending at an angle with respect to both the axis and the slots of said tube; a dielectric shape supported within said tube by a plurality of pairs of diametrically opposed pins secured thereto and each extending through one slot of one of said pairs of slots and securely anchored in said sleeve, said pins also acting to constrain said sleeve against movement excepting angularly with respect to said tube; and a solenoid having its coil disposed in fixed relationship to said tube and parallel thereto, the plunger of said solenoid having a depending boss extending into the slot in said sleeve, said boss acting upon longitudinal movement of said plunger to impart angular movement to said sleeve and thereby to said dielectric shape through the cam-like action of said boss upon at least one side of the slot in said sleeve.

10. In a high frequency radio wave guide, a combination including: a first tube for guiding a polarized wave; a second tube surrounding at least a portion of said first tube and having a slot therein extending at least a few degrees therearound at a non-right angle to the axes of said tubes; a solenoid having its coil disposed in fixed relationship to said first tube and parallel thereto, the plunger of said solenoid having aligned protrusions extending laterally from opposite sides of said plunger near the end thereof that does not enter said coil; a housing surrounding said solenoid and having a pair of longitudinally extending slots on opposite sides thereof to permit said protrusions to slidably pass therethrough; and a dielectric shape supported within said first tube and so connected to said second tube through the walls of said first tube that the dielectric shape and second tube may move angularly together with respect to said first tube; one of said protrusions having a roller surrounding its end portion and extending into the slot in said second tube and acting upon longitudinal movement of said plunger in response to the energizing of said coil to rotate said second tube by its cam-like action upon at least one side of the slot in said second tube.

11. In a high frequency radio wave guide, a combination including: a tube for guiding a polarized wave, said tube having a plurality of axially spaced pairs of diametrically opposed and circumferentially extending slots therein; a sleeve covering at least the slotted portions of said tube and having a slot therein extending at an angle with respect to both the axis and the slots of said tube; a dielectric shape supported within said tube by a plurality of pairs of diametrically opposed pins secured thereto and each extending through one slot of one of said pairs of slots and securely anchored in said sleeve, said pins also acting to constrain said sleeve against movement excepting angularly with respect to said tube; a solenoid having its coil disposed in fixed relationship to said tube and parallel thereto, the plunger of said solenoid having aligned protrusions extending laterally from opposite sides of said plunger near the end thereof that does not enter said coil; a housing surrounding said solenoid and having a pair of longitudinally extending slots on opposite sides thereof to permit said protrusions to slidably pass therethrough; one of said protrusions having a roller surrounding its end portion and extending into the slot in said sleeve and acting upon longitudinal movement of said plunger in response to the energizing of said coil to rotate said sleeve and said dielectric shape by its cam-like action upon at least one side of the slot in said sleeve.

References Cited in the file of this patent

UNITED STATES PATENTS

| | | |
|---|---|---|
| 2,603,709 | Bowen | July 15, 1952 |
| 2,603,710 | Bowen | July 15, 1952 |
| 2,607,849 | Purcell | Aug. 19, 1952 |
| 2,857,575 | Zaleski | Oct. 21, 1958 |
| 2,858,512 | Barnett | Oct. 28, 1958 |
| 2,892,157 | Schlauker | June 23, 1959 |